US012692995B2

(12) United States Patent
Eckstein et al.

(10) Patent No.: US 12,692,995 B2
(45) Date of Patent: Jul. 28, 2026

(54) ARRANGEMENT OF LIGHT SHAPING OPTICAL ELEMENTS FOR AUTOMOTIVE SIGNAL LIGHTING

(71) Applicant: Atieva, Inc., Newark, CA (US)

(72) Inventors: Hans-Christoph Eckstein, Woodside, CA (US); Wiebke Eckstein, Woodside, CA (US); Eric Magnus Bach, Los Altos Hills, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/705,082

(22) PCT Filed: Oct. 28, 2022

(86) PCT No.: PCT/US2022/078888
§ 371 (c)(1),
(2) Date: Apr. 26, 2024

(87) PCT Pub. No.: WO2023/077076
PCT Pub. Date: May 4, 2023

(65) Prior Publication Data
US 2024/0426451 A1 Dec. 26, 2024

Related U.S. Application Data

(60) Provisional application No. 63/263,297, filed on Oct. 29, 2021.

(51) Int. Cl.
*F21S 43/241* (2018.01)
*F21S 43/14* (2018.01)
(Continued)

(52) U.S. Cl.
CPC ............. *F21S 43/241* (2018.01); *F21S 43/14* (2018.01); *F21S 43/15* (2018.01); *F21S 43/249* (2018.01); *F21S 43/26421* (2024.05)

(58) Field of Classification Search
CPC ........ F21S 43/241; F21S 43/249; F21S 43/14; F21S 43/15; F21S 43/26421
See application file for complete search history.

(56) References Cited

U.S. PATENT DOCUMENTS 7,837,361 B2 11/2010 Santoro et al.
7,850,334 B2 12/2010 Holder et al.
(Continued)

FOREIGN PATENT DOCUMENTS

CN 206724036 U * 12/2017 ............ F21S 43/249
CN 207817249 U * 9/2018 .............. F21S 43/14
(Continued)

OTHER PUBLICATIONS

International Search Report and Written Opinion for PCT Application No. PCT/US2022/078888, mailed Jan. 11, 2023, 8 pages.
(Continued)

*Primary Examiner* — Matthew J. Peerce
(74) *Attorney, Agent, or Firm* — Brake Hughes Bellermann LLP

(57) ABSTRACT

A vehicle includes individual light sources that are separated in space from neighboring light sources. Collimators can collimate light emitted from the light sources, and a first diffusing surface is configured to receive the collimated light and to diffuse the collimated light in a first direction transverse to a first propagation direction of the collimated light. A second diffusing surface is configured to receive the light diffused by the first diffusing surface and to diffuse the received light in a second direction transverse to a second propagation direction of the collimated light.

10 Claims, 7 Drawing Sheets

(51) Int. Cl.
*F21S 43/15* (2018.01)
*F21S 43/20* (2018.01)
*F21S 43/249* (2018.01)

(56) References Cited

U.S. PATENT DOCUMENTS

| | | | | |
|---|---|---|---|---|
| 10,232,763 | B1 | 3/2019 | Eckstein et al. | |
| 11,041,600 | B2 * | 6/2021 | Sato | F21S 43/241 |
| 11,079,087 | B2 * | 8/2021 | Ichinohe | F21S 43/14 |
| 11,761,600 | B2 * | 9/2023 | Wu | F21V 7/06 362/509 |
| 11,828,432 | B2 * | 11/2023 | Zhao | F21S 43/26 |
| 11,846,400 | B2 * | 12/2023 | Yoshino | F21S 43/14 |
| 2012/0281401 | A1 | 11/2012 | Li | |
| 2015/0049503 | A1 | 2/2015 | Paroni et al. | |
| 2022/0349548 | A1 * | 11/2022 | Saito | F21S 43/239 |

FOREIGN PATENT DOCUMENTS

| | | | |
|---|---|---|---|
| CN | 212584877 | U | 2/2021 |
| JP | 2016157611 | A | 9/2016 |

OTHER PUBLICATIONS

Extended European Search Report for European Application No. 22888538.0, mailed Jul. 25, 2025, 10 pages.

* cited by examiner

ARRANGEMENT OF LIGHT SHAPING OPTICAL ELEMENTS FOR AUTOMOTIVE SIGNAL LIGHTING

CROSS-REFERENCE TO RELATED APPLICATION

This application is a 35 U.S.C. § 371 National Phase Entry Application from PCT Application No. PCT/US2022/078888, filed on Oct. 28, 2022, entitled "ARRANGEMENT OF LIGHT SHAPING OPTICAL ELEMENTS FOR AUTOMOTIVE SIGNAL LIGHTING", and designating the U.S., which claims priority to U.S. Provisional Patent Application No. 63/263,297, filed on Oct. 29, 2021, and entitled "ARRANGEMENT OF LIGHT SHAPING OPTICAL ELEMENTS FOR AUTOMOTIVE SIGNAL LIGHTING," the disclosures of which are incorporated by reference herein in their entireties.

TECHNICAL FIELD

This disclosure relates to lights of a vehicle and, in particular, to arrangements of light shaping optical elements for automotive signal lighting.

BACKGROUND

Vehicles are required to have headlights, taillights, and other lighting sources. The light sources generally must provide high luminosity, which may require the use of multiple individual light sources to provide the light.

SUMMARY

In some aspects, a vehicle light includes a plurality of individual light sources, each light source being separated in space from neighboring ones of the light sources. The vehicle light includes a plurality of collimators configured to collimate light emitted from the light sources, and a first diffusing surface located at a first light-path distance from the light sources. The first diffusing surface is configured to receive the collimated light and to diffuse the collimated light in a first direction transverse to a first propagation direction of the collimated light. A second diffusing surface is located at a second light-path distance from the first diffusing surface, and the second diffusing surface is configured to receive the light diffused by the first diffusing surface and to diffuse the received light in a second direction transverse to a second propagation direction of the collimated light. The second direction is transverse to the second propagation direction. The first propagation direction is a direction in which the light propagates after being diffused by the first diffusing surface and before being diffused by the second diffusing surface, and the second propagation direction is a direction in which light propagates after being diffused by the second diffusing surface.

Implementations can include one or more of the following features, alone, or in any combination with each other.

For example, the vehicle light can be selected from the group consisting of a taillight, a daytime running light, a brake light, a turn signal light, and a CHMSL.

For example, a diffusion angle of the light diffused by the second diffusing surface can be greater than an inverse tangent of the quotient of the second light-path distance and the distance between neighboring light sources.

For example, the first diffusing surface and the second diffusing surface can be surfaces of a light shaping element having a refractive index of greater than 1.4, and the first diffusing surface and the second diffusing surface can be surfaces at interfaces between the light-shaping element and air around the element.

For example, light propagating in the light-shaping element can experience total internal reflection at at least one of the first diffusing surface and the second diffusing surface.

For example, each of the collimators can be configured to collimate light emitted from the light sources into a solid angle of less than five degrees.

For example, each of the collimators can be configured to collimate light emitted from the light sources into a solid angle of less than five degrees.

For example, the second propagation direction can be different from the first propagation direction.

For example, the second propagation direction can be anti-parallel to the first propagation direction.

For example, the collimators, and the first diffusing surface can be configured such that a first linear light pattern from the plurality of individual light sources is formed on the second diffusing surface, the first linear light pattern having intensity maxima and minima along a longitudinal axis of the first linear light pattern corresponding to the light sources that are separated in space from each other, the difference between the intensity maxima and minima being less than 50% of the maxima.

For example, the collimators, the first diffusing surface, and the second diffusing surface can be configured such that a linear light pattern from the plurality of individual light sources is formed at a distance five meters away the second diffusing surface, the linear light pattern having intensity maxima and minima along a longitudinal axis of the linear light pattern corresponding to the light sources that are separated in space from each other, the difference between the intensity maxima and minima being less than 50% of the maxima.

For example, the difference between the intensity maxima and minima can be less than 20% of the maxima.

For example, the second diffusing surface can have a normal direction, relative to a fixed coordinate system, that changes in a direction along the second direction transverse to a second propagation direction over a length scale that is greater than a wavelength of the light.

DETAILED DESCRIPTION

Figure 1:
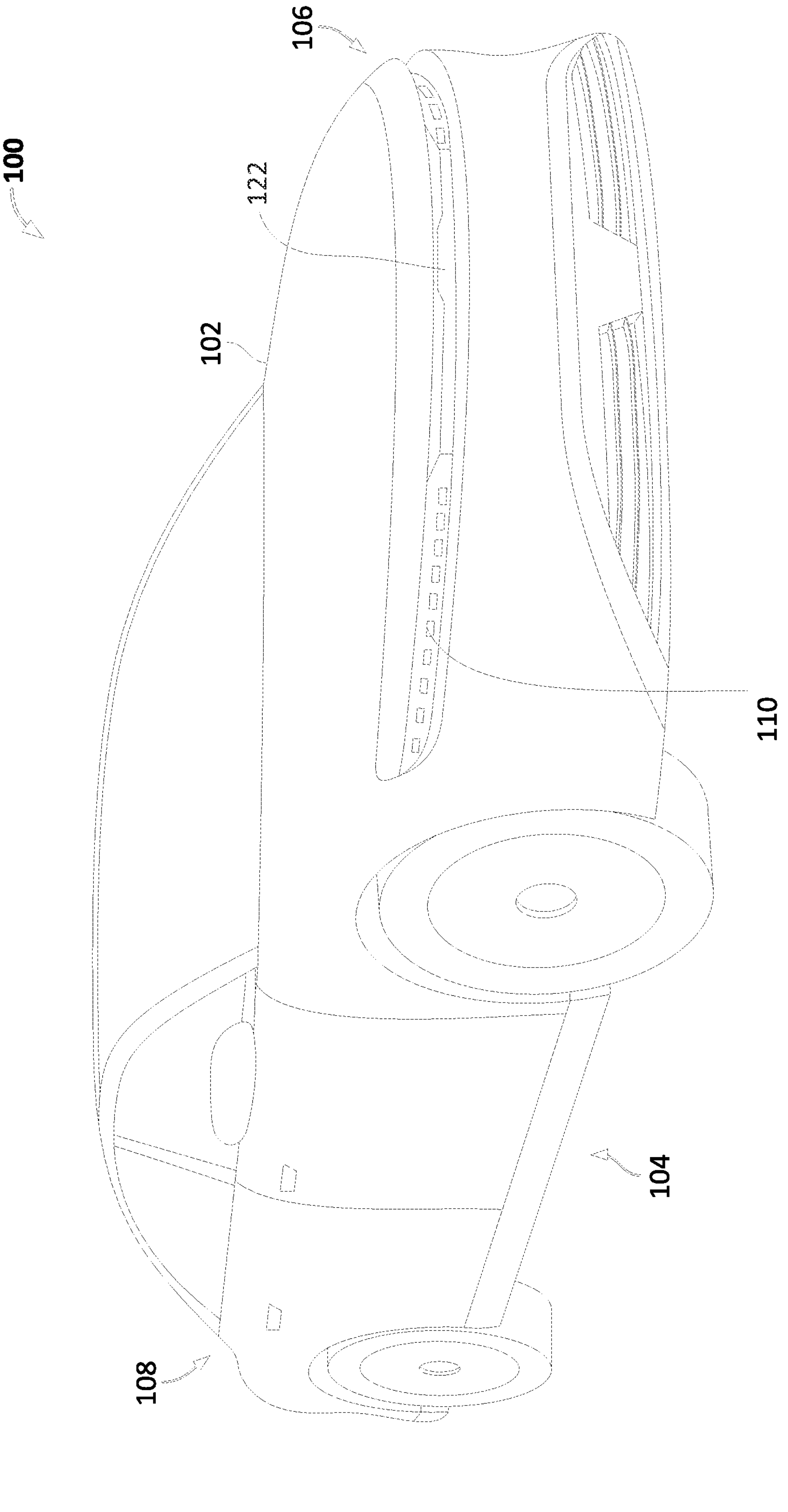
FIG. 1 shows an example perspective view of a vehicle.

This document describes example arrangements of pluralities of light sources and optical elements configured to shape the emission patterns of light emitted from the sources, such that the emitted light appears to be emitted from a single continuous light source. For example, a plurality of light sources can include an array of individual light emitting diodes (LEDs), and the optical elements can control the angular emission patterns of light from the light sources, such that the angular emission patterns of light from different light sources overlap and are diffused, so that the light from the plurality of light sources appears to be emitted from a single continuous light source. Arrangements of the light sources and the optical elements are disclosed that maximize the optical efficiency for a particular designed function of the plurality of light sources, while also minimizing the number of light sources required to perform the function.

Current design trends in automotive signal lighting pursue a slim appearance and high homogeneity of the apparent lit surface and try to avoid visibility of the light sources or visible maxima in the luminance caused by the light source arrangement. Devices and techniques are disclosed herein which provide these design goals while keeping a high luminous intensity in certain directions that are important to achieve visibility and to meet legal light intensity values and at the same time minimize the necessary total flux of the light sources and the number of light sources used for a given application.

Examples described herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. A vehicle can be powered by one or more types of power sources. In some implementations, a vehicle is powered solely by electricity, or can use one or more other energy sources in addition to electricity, to name just a few examples.

As used herein, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Examples herein refer to a vehicle chassis. A vehicle chassis is a framework that bears the load of the rest of the vehicle. A vehicle chassis can include one or more frames, which can be made of steel, aluminum alloy, or another stiff and strong material. For example, a vehicle chassis is sometimes made of at least two side rails connected by multiple cross members for structural integrity. One or more other components, including, but not limited to, a battery pack for an electric or hybrid vehicle, can be integrated into or otherwise combined with a vehicle chassis. A subframe is a chassis portion that can carry certain components, including but not limited to, a motor, drivetrain, or suspension, to spread chassis loads and/or isolate vibrations and harshness.

Examples herein refer to a vehicle body. A vehicle body is the main supporting structure of a vehicle to which components and subcomponents are attached. In vehicles having unibody construction, the vehicle body and the vehicle chassis are integrated into each other. As used herein, a vehicle chassis is described as supporting the vehicle body also when the vehicle body is an integral part of the vehicle chassis. The vehicle body often includes a passenger compartment with room for one or more occupants; one or more trunks or other storage compartments for cargo; and various panels and other closures providing protective and/or decorative cover.

FIG. 1 shows an example perspective view of a vehicle 100. The vehicle 100 can be used with one or more other examples described elsewhere herein. The vehicle 100 includes a vehicle body 102 and a vehicle chassis 104 supporting the vehicle body 102. For example, the vehicle body 102 is here of a four-door type with room for at least four occupants, and the vehicle chassis 104 has four wheels. Other numbers of doors, types of vehicle body 102, and/or kinds of vehicle chassis 104 can be used in some implementations.

The vehicle body 102 has a front 106 and a rear 108. The vehicle 100 can have at least one motor, which can be positioned in one or more locations of the vehicle 100. In some implementations, the motor(s) can be mounted generally near the front 106, generally near the rear 108, or both. The vehicle 100 can have at least one lighting component, which can be situated in one or more locations of the vehicle 100. For example, the vehicle 100 can have one or more headlights 110 and daytime running lights 122 mounted generally near the front 106.

Figure 2:
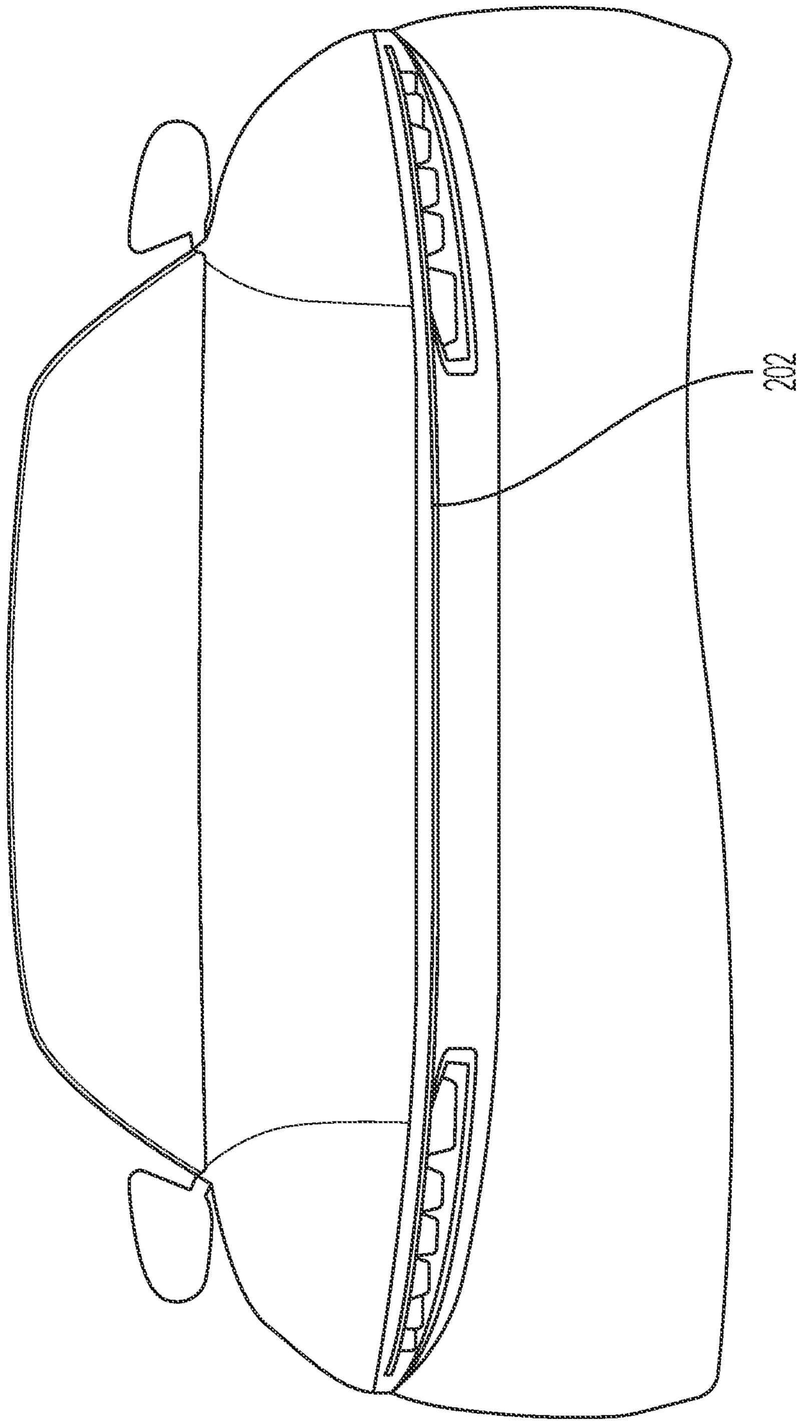
FIG. 2 shows an example front view of a vehicle.

FIG. 2 shows an example front view of a vehicle 200. The vehicle 200 can include two headlight arrays 202 and daytime running lights 204. The daytime running lights 204 can rely on a plurality of separated light sources to provide the emitted light but where components of the lights 204 are configured such that emitted light appears as a continuous line of light that extends from above a first headlight array 202 on a first side of the vehicle to above a second headlight array 202 on a second side of the vehicle.

Figure 3:
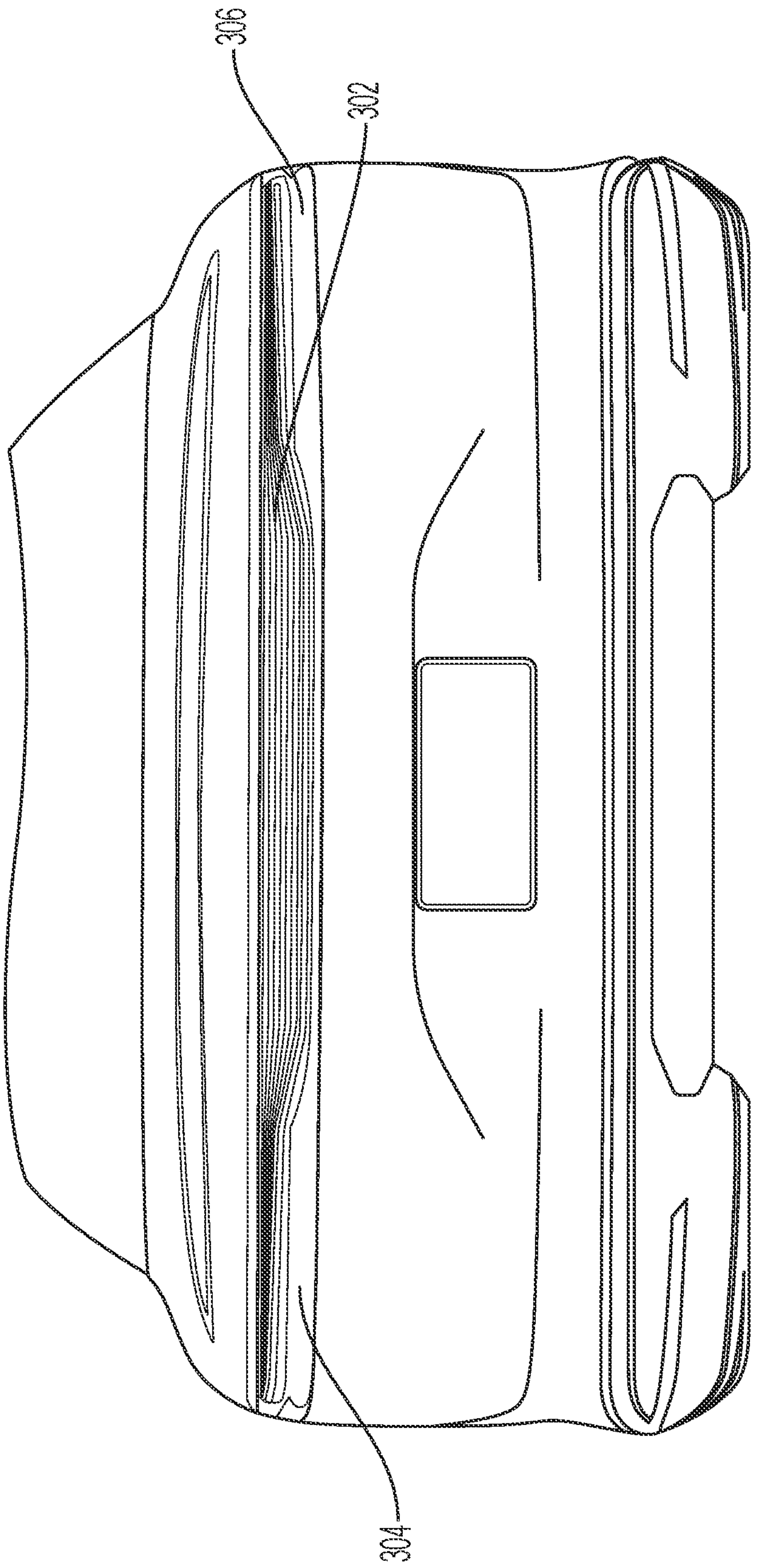
FIG. 3 shows an example rear view of a vehicle.

FIG. 3 shows an example rear view of a vehicle 300. The vehicle 300 can include a left turn signal light 304 and a right turn signal light 306. The vehicle 300 also can include a light 302 that is configured to appear as a continuous line of light that extends from above the left turn signal light 304 on a first side of the vehicle to above a right turn signal light 304 on a second side of the vehicle. The light 302 can function, for example, as a third brake light, as a taillight, center high mount stop lamp, (CHMSL) etc.

Figure 4:
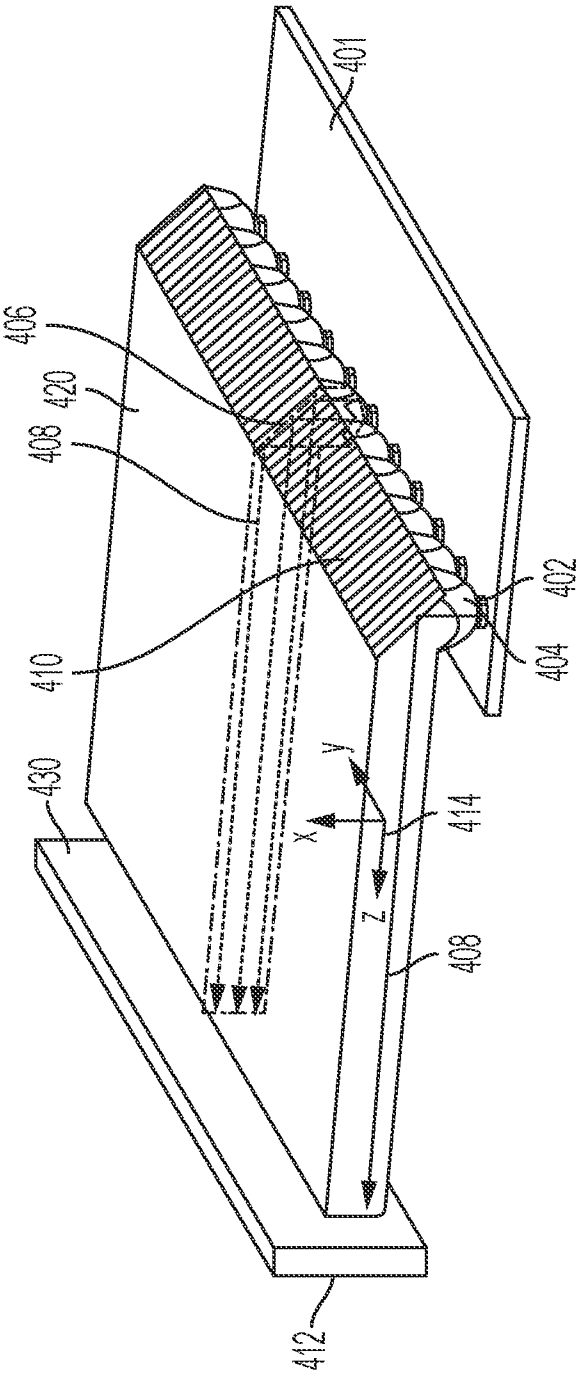
FIG. 4 is a schematic perspective view of a light having a plurality of individual light sources that are separated in space, and light shaping optical elements configured to homogenize the emission profile of the light.

Light emitted from the lights shown in FIGS. 2, 3, and 4 can be emitted from a plurality of individual light sources that are separated in space, and the emitted light can be shaped by one or more optical elements such that an emission profile of the light to a person located a predetermined distance from the light is of a homogenous, continuous light, despite having been originally emitted from the plurality of light sources.

FIG. 4 is a schematic perspective view of a light having a plurality of individual light sources 402 (e.g., LEDs, lasers, or VCSELs) that are separated in space, and light shaping optical elements configured to homogenize the emission profile of the light. The light sources 402 can be provided on a printed circuit board (PCB) 401. Light emitted from the light sources 402 can be focused, or collimated, into a narrow angular distribution (e.g., less than five degrees solid angle) by one or more symmetric, or spherical, lens surfaces 404 located close to each light source.

After collimation of the light, the angular emission profile of the light can be shaped by a light-shaping element 420. In some implementations, the light-shaping element 420 can include a transparent material having a high refractive index (e.g., a refractive index of greater than 1.4) and one or more surfaces that can redirect and/or diffuse the light. In some implementations, the refractive index of the material can be greater than 1.4, so that a critical angle for total internal reflection between an interface of the material of the light-shaping element 420 and air can be less than 45° to a normal direction to the interface. In some implementations, the light-shaping element 420 can be formed of a plastic material, for example, polycarbonate, which has an index of refraction of approximately 1.59.

In some implementations, light from the light sources 402, which is directed upward (i.e., in a direction perpendicular to the PCB 401), is collimated by collimation lenses 404, and enters the light shaping element 420 through a bottom surface of the light-shaping element. Once inside the light-shaping element 420, the light can be reflected off a first interface surface 406 between the light-shaping element and air outside the element. For example, the light can strike the surface 406 at a 45° angle to the normal direction of the surface, so that the light is reflected by total internal reflection from the surface 406. After reflection from the surface 406, the light 408 can propagate through the light-shaping element 420 to a second interface surface 412 between the light-shaping element 420 and air outside the element and can exit the light shaping element 420 at the second interface surface. In a coordinate system 414 shown in FIG. 4, a dominant propagation direction of the light through the light shaping element 420 when exiting the second interface surface 412 can be in a z-axis direction.

The first interface surface 406 can include a light-diffusing structure 410 that increases the angular distribution of light in a first direction (e.g., a direction along the Y-axis) perpendicular to the propagation direction of the light when the light exits the light-shaping element 420 to an amount that is greater than the angular distribution of the light in a second direction (e.g., a direction along the X-axis) perpendicular to the propagation direction. In this manner, the light-diffusing structure 410 on interface 406 can cause the narrowly-collimated light from the separated light sources 402 to be spread over the second interface surface 412 such that differences between light intensity maxima and minima on the interface surface 412 are less than 50% of the maxima or less than 20% of the maxima. In this manner, light from the multiple light sources 402 can be spread in the Y-axis direction to create a nearly homogeneous light intensity profile on the interface surface 412, while also minimizing the spread of the light in the X-axis direction, so that interactions between the light and top and bottom surfaces of the light-shaping element 420 are reduced and an appreciable amount of light is not lost out of the top and bottom surfaces.

The second interface surface 412 also can include a light-diffusing structure 430 that preferentially diffuses the light in the Y-axis direction, as compared with the X-axis direction, when the light exits the surface 412 and is emitted from the light-shaping element 420. Thus, to an observer located a distance (e.g., five meters or more) away from the surface 412, the surface 412 may appear to provide a homogeneous source of light along a length of the surface in the Y-axis direction and to emit the light from the surface with an angular emission angle in the Y-axis direction that is greater than the angular emission distribution angle and the X-axis direction. In some implementations, the difference between the intensity maxima and minima on the surface 412 may be less than 50% of the maxima or less than 20% of the maxima. That is, because of the configuration of the collimators, the first diffusing surface, and the second diffusing surface a linear light pattern in the light emitted from the individual light sources is formed at a distance from the second diffusing surface. The linear light pattern has intensity maxima and minima along a longitudinal axis of the linear light pattern, which maxima and minima correspond to the light sources that are separated in space from each other, but the difference between the intensity maxima and minima (e.g., as measure in Watts per square meter) along the axis of the liner light pattern is less than 50% of the maxima.

Figure 5:
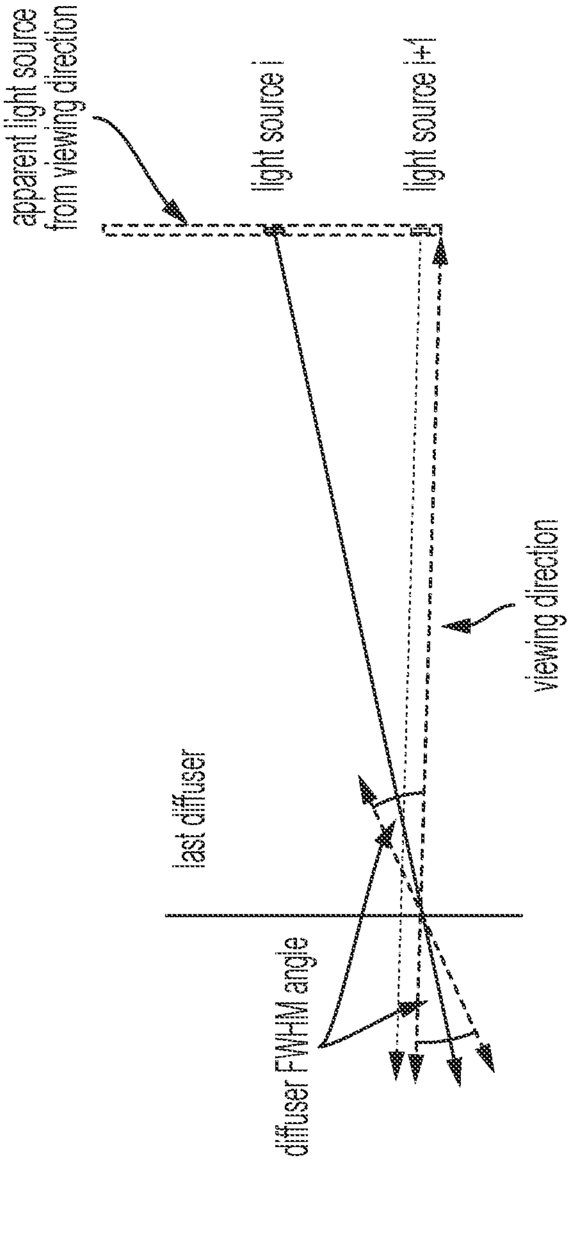
FIG. 5 is a schematic diagram of a plurality of light sources arranged in a row, which provide collimated light to a diffuser that diffuses the provided light in a direction transverse to the propagation direction.

FIG. 5 is a schematic diagram of a plurality of light sources (e.g., light source i and light source i+1) arranged in a row and that provide collimated light to a diffuser (e.g., last diffuser in FIG. 5) that diffuses the provided light in a direction transverse to the propagation direction over a full width half max (FWHM) angle, θ. When adjacent light sources in the row are separated from each other by a pitch distance, p, and the light sources are separated from the diffuser by a distance, d, then when $\theta > 2\tan^{-1}(p/d)$, the images of the light sources on the diffuser may appear to overlap, such that an observer perceives the diffuser as a homogenous source.

Figure 6:
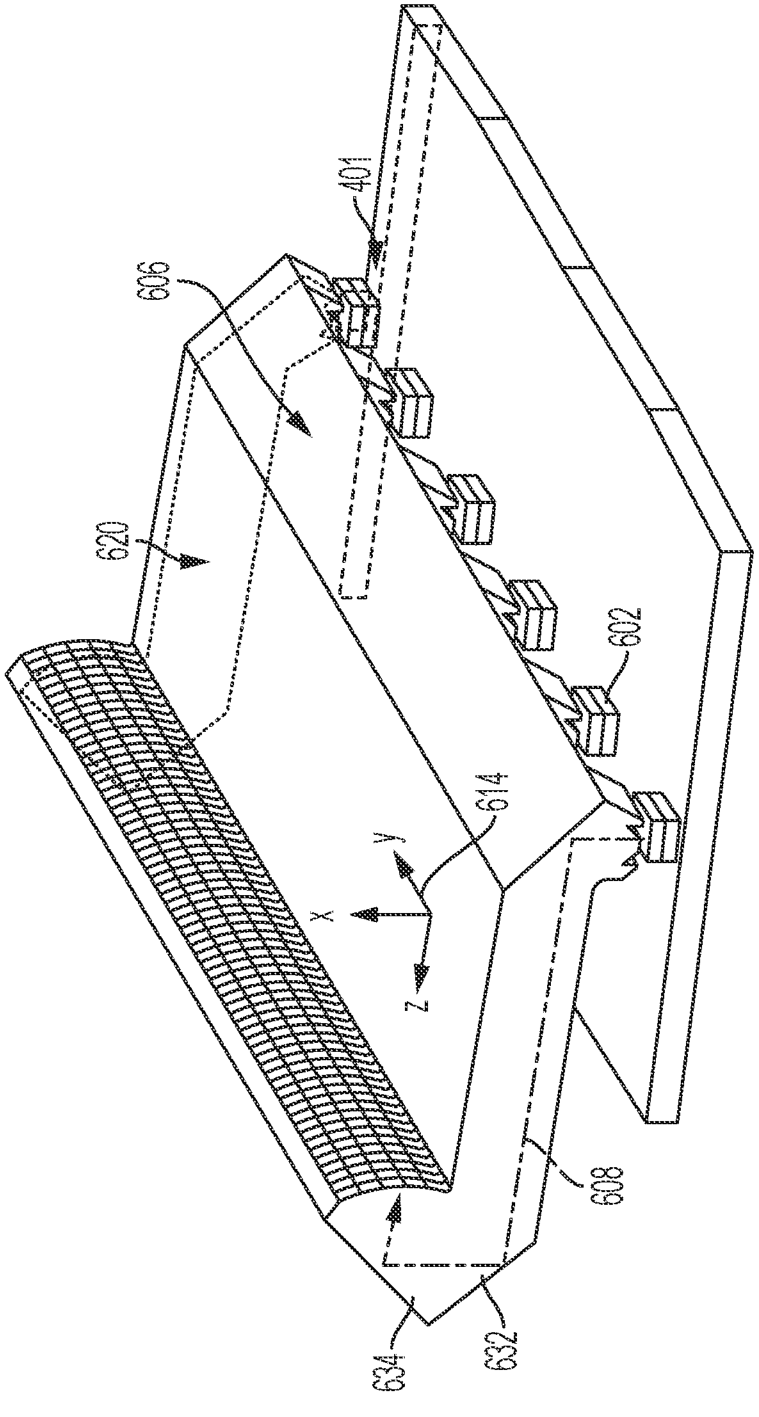
FIG. 6 is a schematic perspective view of a light having a plurality of individual light sources that are separated in space and light shaping optical elements configured to homogenize the emission profile of the light.

Variations on the light-shaping element of FIG. 4 are within the scope of the disclosure. For example, FIG. 6 is a schematic perspective view of a light having a plurality of individual light sources 602 (e.g., LEDs, lasers, or VCSELs) that are separated in space, and light shaping optical elements configured to homogenize the emission profile of the light. Light emitted from the light sources 602 can be focused, or collimated, into a narrow angular distribution (e.g., less than five degrees solid angle) by one or more symmetric, or spherical, lens surfaces located close to each light source.

After collimation of the light, the angular emission profile of the light can be shaped by a light-shaping element 620. In some implementations, the light-shaping element 620 can include a transparent material having a high refractive index (e.g., a refractive index of greater than 1.4) and one or more surfaces that can redirect or defuse the light. In some implementations, the refractive index of the material can be greater than 1.4, so that a critical angle for total internal reflection between an interface of the material of the light-shaping element 620 and air can be less than 45° to a normal direction to the interface. In some implementations, the light-shaping element 620 can be formed of a plastic material, for example, polycarbonate, which has an index of refraction of approximately 1.59.

In some implementations, light from the light sources 602 is collimated by collimation lenses and enters the light shaping element 620 through a bottom surface of the light-shaping element. Once inside the light-shaping element 620, the light can be reflected off a first interface surface 606 between the light-shaping element and air outside the element. For example, the light can strike the surface 606 at a 45° angle to the normal direction of the surface, so that the light is reflected by total internal reflection from the surface 606. After reflection from the surface 606, the light 608 can propagate through the light-shaping element 620 to a second interface surface 612 between the light-shaping element 620 and air outside the element and can exit the light shaping element 620 at the second interface surface. In a coordinate system 614 shown in FIG. 6, a dominant propagation direction of the light through the light shaping element 620 when exiting the second interface surface 612 can be in a z-axis direction.

The first interface surface 606 can include a light-diffusing structure that increases the angular distribution of light in a first direction (e.g., a direction along the Y-axis) perpendicular to the propagation direction of the light when the light exits the light-shaping element 620 to an amount that is greater than the angular distribution of the light in a second direction (e.g., a direction along the X-axis) perpendicular to the propagation direction. In this manner, the light-diffusing structure on interface 606 can cause the narrowly-collimated light from the separated light sources 602 to the spread over the second interface surface 612 such that differences between light intensity maxima and minima on the interface surface 612 are less than 20% of the maxima. In this manner, light from the multiple light sources 602 can be spread in the Y-axis direction to create a nearly homogeneous light intensity profile on the interface surface 612, while also minimizing the spread of the light in the X-axis direction, so that interactions between the light and top and bottom surfaces of the light-shaping element 620 are reduced and an appreciable amount of light is not lost out of the top and bottom surfaces.

The second interface surface 612 also can include a light-diffusing structure that preferentially diffuses the light in the Y-axis direction, as compared with the X-axis direction, when the light exits the surface 612 and is emitted from the light-shaping element 620. Thus, to an observer located a distance (e.g., five meters or more) away from the surface 612, the surface 612 may appear to provide a homogeneous source of light along a length of the surface in the Y-axis direction and to emit the light from the surface with an angular emission angle in the Y-axis direction that is greater than the angular emission distribution angle and the X-axis direction. In some implementations, the difference between the intensity maxima and minima on the surface 612 may be less than 50% of the maxima or less than 20% of the maxima.

As the light 608 propagates along a beam path from the first surface 606 through the light-shaping element 620 to the second interface surface 612, the light may be redirected (e.g., reflected) by one or more intermediate surfaces 632, 634 along the beam path between the first and second surfaces 606, 612. For example, the one or more intermediate surfaces 632, 634 can include surface interfaces between material of the light-shaping element 620 and air outside the element that are angled with respect to the beam path of the light 608, such that the light experiences total internal reflection from the one or more intermediate surfaces 632, 634. Thus, the beam path can be folded between the first and second surfaces 606, 612, which can increase the path length between the first and second surfaces 606, 612, compared with a configuration (e.g., as shown in FIG. 4) in which a straight path exists between the first and second surfaces 606, 612. By increasing the path length distance, the diffusion angle, θ, can be reduced, while still achieving a light distribution on the second surface in which the FWHM light emission from neighboring light sources 602 overlap. Thus, a first propagation direction of the light after it is diffused by the first surface 606 and before it is diffused by the second surface 612 can be different from a second propagation direction of the light after the light is diffused by the second diffusing surface 612. For example, the second propagation direction can be anti-parallel to (e.g., opposite to) the first propagation direction, or the second propagation direction can be non-parallel to the first propagation direction.

Figure 7:
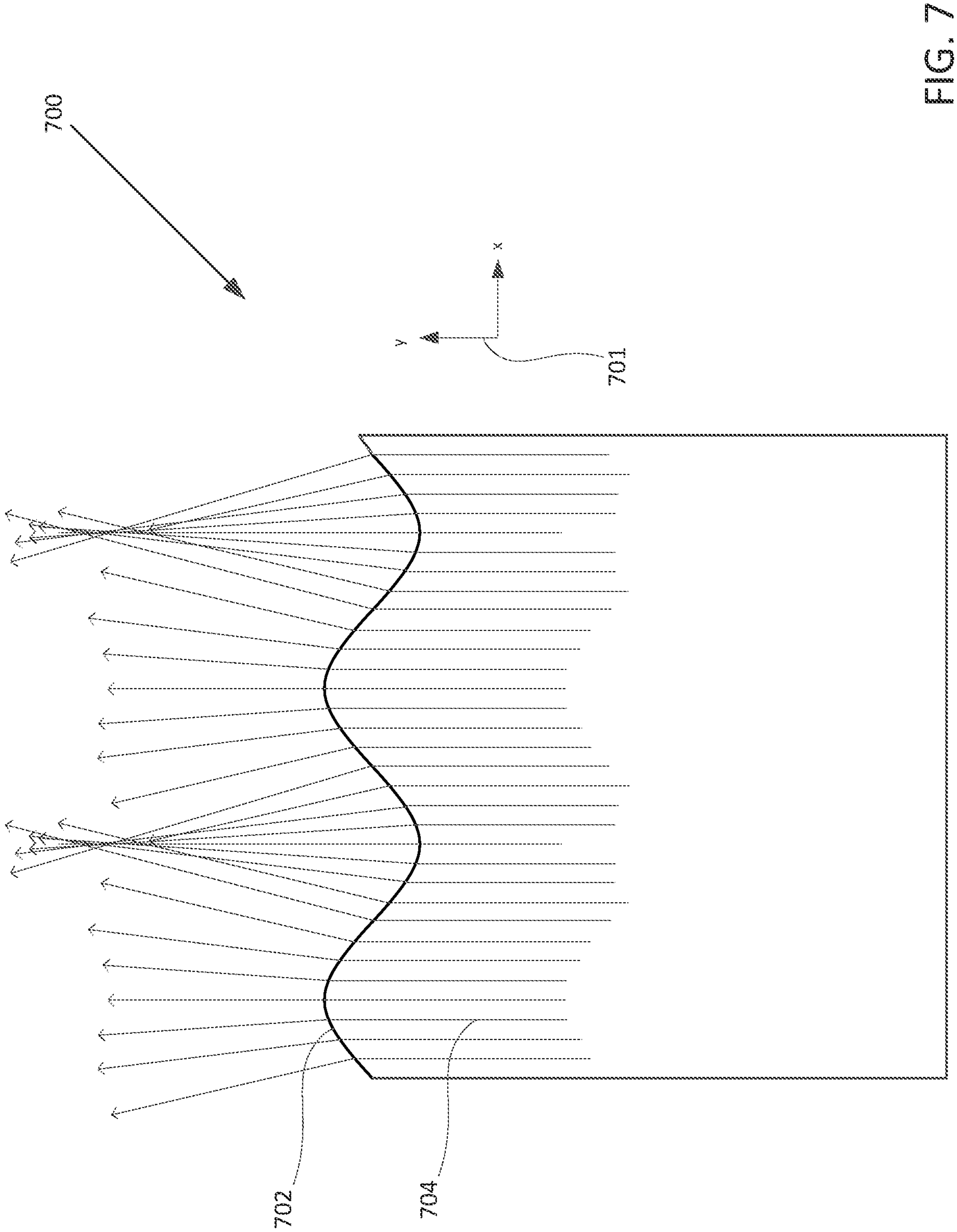
FIG. 7 is a schematic diagram of an example light-diffusing structure at an interface between a light-shaping element and air surrounding the light-shaping element.

FIG. 7 is a schematic diagram of an example light-diffusing structure 700 at an interface between a light-shaping element 420, 620 and air surrounding the light-shaping element, where the light-diffusing structure diffuses the propagation directions of incoming light rays that interact with the structure (e.g., through either reflection or refraction). For example, the light-diffusing structure can be part of the high refractive index light-shaping element 420 or 620. The light-diffusing structure 700 can include a surface 702 whose normal direction, relative to a fixed coordinate system 701, changes over a length scale that are large (i.e., greater than) a wavelength of the light that interacts with the surface 702. As shown FIG. 7, incoming parallel light rays 704 propagate within light-diffusing structure 700 and impinge on and pass through the surface. Because of the varying normal direction of the surface 702, light rays are diffracted according to Snell's Law, by different angles at different locations on the surface 702 of the light-diffracting structure 700, such that light emitted from the surface is diffused in the x-axis direction of the coordinate system 701. Although very close to the surface 702, the emitted light may have large spatial variations of intensity at distances relevant to a human observer (e.g., greater than 1 meter), the intensity may appear uniformly distributed. If desired, the normal direction of the surface can be varied in the z-axis direction, such that the surface 702 diffuses the light in the z-axis direction as well.

While diffusion due to varying refraction angles is shown in FIG. 7, when the surface 702 is oriented with respect to the propagation direction of the parallel light rays 704, such that light is reflected (e.g., totally internally reflected) by the surface, diffusion due to varying reflection angles also is possible.

As shown in FIG. 7, the normal direction of the surface 702 varies continuously across the surface and does not have any discontinuities. In other words, the derivative of the normal direction as a function of position on the surface does not approach infinity or increase suddenly (e.g., by more than 10 times an average of the absolute value of the derivative over the surface). Because of this, fabrication of such a light-diffusing structure 702 can be easier than for a structure that includes only convex or only concave surface structures, in which fabricating the connections between adjacent convex or concave structures can place high performance demands on the tooling used to fabricate such a structure.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter appearing in this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems.

While certain features of the described implementations have been illustrated as described herein, many modifications, substitutions, changes and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the invention.

What is claimed is:

1. A vehicle light comprising:

a plurality of individual light sources, each light source being separated in space from neighboring ones of the light sources;

a plurality of collimators configured to collimate light emitted from the light sources, each collimator including a refractive symmetric lens surface configured to focus the light emitted from a light source;

a light-shaping element having a refractive index of greater than 1.4 and which includes:

a first diffusing surface located at a first interface between the light-shaping element and air around the light-shaping element and at a first light-path distance from the light sources, the first diffusing surface being configured to receive the collimated light into the light-shaping element and to diffuse the collimated light predominantly in a first direction transverse to a first propagation direction of the collimated light, such that the diffused light has an angular distribution in the first direction that is greater than an angular distribution of the light in a direction that is perpendicular to the first direction and to the propagation direction; and a second diffusing surface located at a second interface between the light-shaping element and air around the light-shaping element and at a second light-path distance from the first diffusing surface, wherein the second interface is located at a surface from which the light exits the light-shaping element, the second diffusing surface being configured to receive the light diffused by the first diffusing surface, which propagates within the light-shaping element from the first diffusing surface to the second diffusing surface, and to diffuse the received light predominantly in a second direction transverse to a second propagation direction of the collimated light, the second direction being transverse to the second propagation direction, such that the diffused light has an angular distribution in the second direction that is greater than an angular distribution of the light in a direction that is perpendicular to the second direction and to the propagation direction, the first propagation direction being a direction in which light propagates after being diffused by the first diffusing surface and before being diffused by the second diffusing surface, and the second propagation direction being a direction in which light propagates after being diffused by the second diffusing surface, the second direction in which the light is diffused by the second diffusing surface being parallel to the first direction in which the light is diffused by the first diffusing surface wherein the second propagation direction is anti-parallel to the first propagation direction.

2. The vehicle light of claim 1, wherein the vehicle light is selected from the group consisting of a taillight, a daytime running light, a brake light, a turn signal light, and a CHMSL.

3. The vehicle light of claim 1, wherein a diffusion angle of the light diffused by the second diffusing surface is greater than an inverse tangent of a quotient of the second light-path distance and the distance between neighboring light sources.

4. The vehicle light of claim 1, wherein a diffusion angle of the light diffused by the first diffusing surface is greater than an inverse tangent of a quotient of the first light-path distance and the distance between neighboring light sources.

5. The vehicle of claim 1, wherein light propagating in the light-shaping element experiences total internal reflection at least one of the first diffusing surface and the second diffusing surface.

6. The vehicle of claim 1, wherein each of the collimators is configured to collimate light emitted from the light sources into a solid angle of less than five degrees.

7. The vehicle of claim 1, wherein the collimators, and the first diffusing surface are configured such that a first linear light pattern from the plurality of individual light sources is formed on the second diffusing surface, the first linear light pattern having intensity maxima and minima along a longitudinal axis of the first linear light pattern corresponding to the light sources that are separated in space from each other, the difference between the intensity maxima and minima being less than 50% of the maxima.

8. The vehicle of claim 1, wherein the collimators, the first diffusing surface, and the second diffusing surface are configured such that a linear light pattern from the plurality of individual light sources is formed at a distance five meters away the second diffusing surface, the linear light pattern having intensity maxima and minima along a longitudinal axis of the linear light pattern corresponding to the light sources that are separated in space from each other, the difference between the intensity maxima and minima being less than 50% of the maxima.

9. The vehicle of claim 8, wherein the difference between the intensity maxima and minima is than 20% of the maxima.

10. The vehicle of claim 1, wherein the second diffusing surface has a normal direction, relative to a fixed coordinate system, that changes in a direction along the second direction transverse to a second propagation direction over a length scale that is greater than a wavelength of the light.

* * * * *